United States Patent [19]

Sinha

[11] 4,439,351

[45] Mar. 27, 1984

[54] USE OF ANIONIC OR CATIONIC POLYMERS TO LOWER THE ELECTRICAL RESISTIVITY OF FLY ASH

[75] Inventor: Rabindra K. Sinha, Coraopolis, Pa.

[73] Assignee: Calgon Corporation, Pittsburgh, Pa.

[21] Appl. No.: 395,390

[22] Filed: Jul. 6, 1982

[51] Int. Cl.$^3$ ............................................. H01B 1/02
[52] U.S. Cl. ..................................... 252/500; 110/344; 110/345; 423/237; 423/242; 423/245; 423/238; 423/243
[58] Field of Search ................ 252/500; 110/341, 342, 110/344, 345; 55/1, 2, 5; 44/62, 72, 76; 423/226, 228, 235, 237, 238, 242, 243, 245; 422/9

[56] References Cited

U.S. PATENT DOCUMENTS

| | | | |
|---|---|---|---|
| 3,887,496 | 6/1975 | Cornier et al. | 252/500 |
| 3,918,935 | 11/1975 | Livingston | 55/85 |
| 4,011,176 | 3/1977 | Saunders et al. | 252/500 |
| 4,185,071 | 1/1980 | Sujdak | 422/9 |
| 4,206,172 | 6/1980 | Sujdak | 110/345 |
| 4,222,901 | 9/1980 | Sinkovitz | 252/500 |
| 4,224,180 | 9/1980 | Sujdak | 110/345 |
| 4,352,747 | 10/1982 | Every et al. | 252/500 |

*Primary Examiner*—Josephine Barr
*Attorney, Agent, or Firm*—R. Brent Olson; William C. Mitchell

[57] ABSTRACT

The instant invention is directed to a process for lowering the electrical resistivity of fly ash comprising adding a cationic or anionic polymer to the fly ash.

10 Claims, No Drawings

USE OF ANIONIC OR CATIONIC POLYMERS TO LOWER THE ELECTRICAL RESISTIVITY OF FLY ASH

BACKGROUND OF THE INVENTION

Fly ash results from the burning of fuel. Utilities and industries burning fuel for energy and power generation are often required to meet strict emission compliance standards for the discharge of fly ash entrained in flue gases. Most of the fly ash entrained in the flue gas is separated by either mechanical means such as cyclones and bag filters or by electrostatic precipitators. Because of better efficiency, electrostatic precipitators are more favored by the users. For an electrostatic precipitator to work efficiently and effectively, the electrical resistivity of the fly ash must be within a certain range, i.e. $1 \times 10^7$ to $2 \times 10^{10}$ ohms cm.

Several attempts have been made in the past to overcome the problems of too high resistivity of the fly ash. Chemical additives such as HCl, $NH_3$, $Na_2CO_3$, $Na_2SO_4$, $(NH_4)_2SO_4$ and $NH(CH_2CH_2OH)_2$ have been used to lower the resistivity of problem ash. However, the above-mentioned additives have met with only limited success.

The polymers of the instant invention have been found to be effective in lowering the electrical resistivity of fly ash.

DESCRIPTION OF THE INVENTION

The instant invention is directed to a process for lowering the electrical resistivity of fly ash comprising adding a cationic or anionic polymer to the fly ash.

Any cationic polymer may be used. Examples include homopolymers of the following monomers: dimethyldiallyl ammonium chloride, ethyleneamine, methacrylamido propyl trimethyl ammonium chloride, 2-methacryloyloxyethyl trimethyl ammonium chloride, 2-methacryloyloxyethyl trimethyl ammonium methosulfate and diquaternary ionene. The preferred cationic polymer is polydimethyldiallyl ammonium chloride.

Any anionic polymer may be used. Examples include homopolymers of the following monomers: acrylic acid, methacrylic acid, vinyl acetic acid, crotonic acid, allylacetic acid, and 4-methyl-4-pentonic acid, vinyl sulfonate, styrene sulfonate and acrylamido methyl propane sulfonic acid.

Copolymers of the above anionic monomers with any ethylenically unsaturated monomer such as: acrylamide, vinyl acetate, styrene, butadiene, vinyl pyrollidone and the like, may also be used The ratio of cationic or anionic monomer to ethylenically unsaturated monomers is not critical; however, it is preferred that the ratio be 20:80 to 80:20.

The preferred anionic polymer is an anionic copolymer of acrylamide and acrylamido methyl propane sulfonic acid.

The molecular weight of the polymers is not critical; however, it is preferred that the molecular weight be less than 1,000,000, as determined by light scattering methods. The polymer is preferably applied as an aqueous solution to the fly ash, such that the treated fly ash contains at least 0.01% of polymer. The polymer solution is preferably sprayed into the combustion gas stream where the fly ash is entrained. The temperature of the flue gas should not exceed 600° F. because the polymer may decompose.

Other ingredients may be added with the polymer to further modify the resistivity and cohesivity of the fly ash. Examples include ammonium nitrate, hydrochloric acid, ammonium sulfate, ammonia, sodium carbonate, sulfonic acid, ammonium persulfate and diethanol amine.

Sulfur trioxide naturally resulting from the burning of some coals will often keep the electrical resistivity of coal fly ash in the critical range for removal of the fly ash with an electrostatic precipitator. With the increased use of low sulfur coals, the level of sulfur trioxide present, however, is insufficient to maintain the necessary electrical resistivity. An anionic copolymer of acrylamide and acrylamido methyl propane sulfonic acid was found to reduce the electrical resistivity of coal fly ash in the presence of sulfur trioxide gas. The presence of sulfur trioxide gas, however, raised the electrical resistivity of coal fly ash when polyvinyl sulfonate, polystyrene sulfonate or polydimethyldiallyl ammonium chloride were used.

EXAMPLES

EXAMPLES 1 THROUGH 6

Paper coated with varying amounts of fly ash, starch and polydimethyldiallyl ammonium chloride were tested for their electrical resistivity. Starch was used as a binder in order to keep the coating on the paper smooth and uniform after it was dry. The resistivity was measured after the coating was equilibrated at 50% relative humidity. The voltage applied was 100 volts. The resistivities are reported in Table I.

TABLE I

Coating Formulation and Resistivity Values (50% RH; 100 V)

| Example | Formulation Composition (g) | | | | % DMDAAC On Treated Ash | Resistivity (ohm-cm) |
|---|---|---|---|---|---|---|
| | Fly Ash | Starch | DMDAAC[1] | Water | | |
| 1 | 12.4 | 2.6 | 0.0 | 15 | Blank | $4.1 \times 10^{11}$ |
| 2 | 8.2 | 1.7 | 0.13 | 10 | 1.5 | $6.9 \times 10^{10}$ |
| 3 | 12.4 | 2.6 | 0.6 | 16 | 5 | $7.4 \times 10^8$ |
| 4 | 12.4 | 2.6 | 1.2 | 16.9 | 10 | $6 \times 10^7$ |
| 5 | 12.4 | 2.6 | 2.5 | 18.7 | 20 | $1.8 \times 10^7$ |
| 6 | 12.4 | 2.6 | 3.7 | 20.6 | 30 | $8.1 \times 10^6$ |

[1]DMDAAC = polydimethyldiallyl ammonium chloride

EXAMPLES 7 THROUGH 10

50 g of fly ash and 25 g of aqueous solution containing 0.5 g of varying polymers were thoroughly mixed and dried at 110° C. for four hours. The resistivity of the dried mixture was measured in various test environments according to U.S. EPA Test No. 600/7-78-035, as reported in Table II.

TABLE II

Performance of Anionic Polymer In Modifyinq Fly Ash Resistivity
Dosage Rate: Approximately 1% by Weight On Ash Basis
Test Conditions: 149° C.; Electric Field Intensity-4 kv/cm
(Resistivity in ohm - cm)

| Example | Test Environment | Blank | AM/AMPSA[1] | Poly-Vinyl Sulfonate | Poly-Styrene Sulfonate |
|---|---|---|---|---|---|
| 7 | 0%, by weight, water in air | $5.0 \times 10^{14}$ | $5.0 \times 10^{14}$ | $3.5 \times 10^{13}$ | $1.2 \times 10^{14}$ |
| 8 | 10%, by | $2.4 \times$ | $9.8 \times 10^{13}$ | $2.4 \times 10^{12}$ | $1.0 \times 10^{13}$ |

TABLE II-continued

Performance of Anionic Polymer
In Modifying Fly Ash Resistivity
Dosage Rate: Approximately 1% by Weight On Ash Basis
Test Conditions: 149° C.; Electric Field Intensity-4 kv/cm
(Resistivity in ohm - cm)

| Example | Test Environment | Blank | AM/AMPSA[1] | Poly-Vinyl Sulfonate | Poly-Styrene Sulfonate |
|---|---|---|---|---|---|
| | weight, water in air | $10^{14}$ | | | |
| 9 | 10%, by weight, water in air + 1.9 ppm $SO_3$ | $9.6 \times 10^9$ | $3.6 \times 10^9$ | $2.5 \times 10^{10}$ | $2.9 \times 10^{10}$ |
| 10 | 10%, by weight, water in air + 1.9 ppm $SO_3$ @ 10 kv/cm | $6.0 \times 10^9$ | $2.4 \times 10^9$ | $1.8 \times 10^{10}$ | $2.7 \times 10^{10}$ |

[1]AM/AMPSA = a 49/51% acrylamide/acrylamido methyl propane sulfonic acid copolymer

EXAMPLES 11 THROUGH 13

50 g of fly ash and 25 g of aqueous solution containing varying amounts of polydimethyldiallyl ammonium chloride were thoroughly mixed and dried at 110° C. for four hours. The resistivity of the dried mixtures were measured in various test environments, according to U.S. EPA Test No. 600/7-78-035, as reported in Table III.

TABLE III

Fly Ash Resistivity, (ohm cm)
(147° C., 4 kv/cm)

| Example | Sample | 0%, By Weight, Water In Air | 9%, By Weight, Water In Air | 9%, By Weight, Water In Air + 0.8 ppm $SO_3$ |
|---|---|---|---|---|
| 11 | Blank | $2.9 \times 10^{13}$ | $1.8 \times 10^{13}$ | $1.4 \times 10^{11}$ |
| 12 | 1% DMDAAC[1] | $5.5 \times 10^{12}$ | $1.1 \times 10^{12}$ | $5.1 \times 10^{12}$ |
| 13 | 5% DMDAAC | $5.3 \times 10^{10}$ | $1.7 \times 10^{10}$ | $1.9 \times 10^{11}$ |

[1]DMDAAC = polydimethyldiallyl ammonium chloride

What is claimed is:

1. A process for lowering the electrical resistivity of fly ash comprising adding a cationic polymer, selected from the group consisting of polymers made from dimethyldiallyl ammonium chloride, ethyleneamine, methacrylamido propyl trimethyl ammonium chloride, 2-methacryloyloxyethyl trimethyl ammonium chloride, 2-methacryloyloxyethyl trimethyl ammonium methosulfate and diquaternary ionene, or an anionic polymer, selected from the group consisting of polymers made from acrylic acid, methyacrylic acid, vinyl acetic acid, crotonic acid, allylacetic acid, 4-methyl-4 pentonic acid, vinyl sulfonate, styrene sulfonate and acrylamido methyl propane sulfonic acid or selected from the group of anionic copolymers made by combining any of the above listed anionic monomers with acrylamide, vinyl acetate, styrene, butadiene or vinyl pryrolidone, to the fly ash.

2. The process of claim 1, wherein an aqueous solution of said cationic polymer is added to the fly ash by spraying the aqueous cationic polymer solution into a combustion gas stream in which fly ash is entrained.

3. The process of claim 1, wherein an aqueous solution of said anionic polymer is added to the fly ash by spraying the aqueous anionic polymer solution into a combustion gas stream in which fly ash is entrained.

4. The process of claim 1, wherein at least 0.01%, by weight, of said polymer is added based on the weight of the fly ash.

5. The process of claim 1, wherein said polymer is dimethyldiallyl ammonium chloride.

6. The process of claim 1, wherein said anionic polymer is selected from the group consisting of a copolymer of acrylamide and acrylamido methyl propane sulfonic acid, vinyl sulfonate and styrene sulfonate.

7. A process for lowering the electrical resistivity of fly ash in the presence of sulfur trioxide comprising adding a copolymer of acrylamide and acrylamido methyl propane sulfonic acid to the fly ash.

8. A process for raising the electrical resistivity of fly ash in the presence of sulfur trioxide comprising adding a polymer selected from the group consisting of polyvinyl sulfonate, polystyrene sulfonate and polydimethyldiallyl ammonium chloride to the fly ash.

9. The process of claim 1, wherein the molecular weight of said anionic or cationic polymer is less than 1,000,000, as determined by light scattering methods.

10. The process of claim 1, wherein said anionic or cationic polymer is added to the fly ash at a point where the gas stream carrying the fly ash is at a temperature of 600° F. or less.

* * * * *